US009685013B2

United States Patent
Nair

(10) Patent No.: US 9,685,013 B2
(45) Date of Patent: Jun. 20, 2017

(54) SYSTEM AND METHOD FOR AUTHENTICATING COMPONENTS OF A VEHICLE

(71) Applicant: NXP B.V., Eindhoven (NL)

(72) Inventor: Mukesh B. Nair, Bangalore (IN)

(73) Assignee: NXP B.V., Eindhoven (NL)

( * ) Notice: Subject to any disclaimer, the term of this patent is extended or adjusted under 35 U.S.C. 154(b) by 173 days.

(21) Appl. No.: 14/063,939

(22) Filed: Oct. 25, 2013

(65) Prior Publication Data

US 2015/0116081 A1    Apr. 30, 2015

(51) Int. Cl.
*G07C 9/00* (2006.01)
*B60R 25/24* (2013.01)
*B60R 25/04* (2013.01)

(52) U.S. Cl.
CPC ........ *G07C 9/00111* (2013.01); *B60R 25/04* (2013.01); *B60R 25/24* (2013.01); *G07C 9/00309* (2013.01); *G07C 2009/00531* (2013.01)

(58) Field of Classification Search
CPC ...... G07C 2009/00531; G07C 2209/63; G07C 9/00309; B60R 25/24; B60R 2021/01293; G06K 17/00; G08B 13/2451; G08B 13/2485; G05B 19/0428; G05B 2219/2641; E02F 3/964
USPC ........... 340/5.61, 5.8, 5.21, 5.2, 572.1, 5.26, 340/5.23, 5.72, 10.3, 539.1, 572.8; 701/32, 33, 35, 36, 2, 1; 364/424.04, 364/424.034
See application file for complete search history.

(56) References Cited

U.S. PATENT DOCUMENTS

| | | | | |
|---|---|---|---|---|
| 5,675,490 A | * | 10/1997 | Bachhuber | B60R 25/04 307/10.2 |
| 6,206,282 B1 | * | 3/2001 | Hayes, Sr. | A45C 13/42 235/375 |
| 6,218,932 B1 | * | 4/2001 | Stippler | B60R 25/04 307/10.2 |
| 6,898,489 B1 | * | 5/2005 | Hayes, Sr. | G06K 17/00 340/5.2 |

(Continued)

FOREIGN PATENT DOCUMENTS

| | | |
|---|---|---|
| CN | 101627173 A | 1/2010 |
| CN | 202686269 U | 1/2013 |

(Continued)

OTHER PUBLICATIONS

Extended European Search Report for EP Patent Appln. No. 14183021.6 (Mar. 23, 2015).

*Primary Examiner* — Mirza Alam
(74) *Attorney, Agent, or Firm* — Rajeev Madnawat

(57) ABSTRACT

System and method for authenticating components of a vehicle are described. In an embodiment, a method for authenticating components of a vehicle involves transmitting an interrogation signal to tags attached to the components of the vehicle from an authentication base station in response to a trigger event, comparing an authentication code received from each of responding tags with an authentication code key at the authentication base station to authenticate the responding tags, and transmitting a disengage signal to an immobilizer installed in the vehicle from the authentication base station to enable the vehicle if all the tags have been authenticated. Other embodiments are also described.

11 Claims, 6 Drawing Sheets

(56) References Cited

U.S. PATENT DOCUMENTS

| | | | |
|---|---|---|---|
| 8,299,891 B2 | 10/2012 | Yamamoto et al. | |
| 2005/0035852 A1* | 2/2005 | Paulsen | G07C 5/085 |
| | | | 340/438 |
| 2005/0261816 A1* | 11/2005 | DiCroce | B60R 25/00 |
| | | | 701/36 |
| 2006/0197381 A1* | 9/2006 | Yoshimura | B60R 25/04 |
| | | | 307/10.2 |
| 2010/0217457 A1* | 8/2010 | Georgi | B60R 25/245 |
| | | | 701/2 |
| 2013/0033381 A1* | 2/2013 | Breed | B60T 1/005 |
| | | | 340/568.1 |

FOREIGN PATENT DOCUMENTS

| | | |
|---|---|---|
| DE | 43 33 474 A1 | 2/1995 |
| DE | 10039778 A1 | 3/2002 |
| DE | 10 2007 03 5351 A1 | 1/2009 |
| FR | 2 959 041 A1 | 10/2011 |

\* cited by examiner

SYSTEM AND METHOD FOR AUTHENTICATING COMPONENTS OF A VEHICLE

Embodiments of the invention relate generally to electronic systems and methods and, more particularly, to systems and methods for online authenticating components of a vehicle.

Automotive theft market has changed over the year. In many instances, stolen automobiles are dismantled and the parts of the stolen automobiles are sold in automotive aftermarket, which is a multi-million dollar business. As components of automobiles become more expensive, there is greater incentive for criminals to target automobiles to illegally profit from sale of automotive components. This is particularly true for batteries of all-electric cars, which are very expensive. In addition, some automotive components are being designed so that they could be easily removed. As an example, batteries of all-electric cars are being designed so that they could be readily removed and exchanged for fully charged batteries. Such designs further provide incentive for criminals to steal automotive components for illegal gain.

One way to reduce automotive theft is the use of alarm systems. However, alarm systems for automobiles have not significantly reduced the number of automotive thefts over the years. This is due to the fact that majority of car thieves can easily disable alarm systems in matter of seconds. Other anti-theft systems do exist, but a determined car thief can get around most of these systems.

In view of these concerns, there is a need for systems and methods to significantly reduce theft of automotive components.

System and method for authenticating components of a vehicle are described. In an embodiment, a method for authenticating components of a vehicle involves transmitting an interrogation signal to tags attached to the components of the vehicle from an authentication base station in response to a trigger event, comparing an authentication code received from each of responding tags with an authentication code key at the authentication base station to authenticate the responding tags, and transmitting a disengage signal to an immobilizer installed in the vehicle from the authentication base station to enable the vehicle if all the tags have been authenticated. Other embodiments are also described.

In an embodiment, a method for authenticating components of a vehicle, the method comprises transmitting an interrogation signal to tags attached to the components of the vehicle from an authentication base station in response to a trigger event, receiving a response signal that includes an authentication code from one or more of the tags attached to the components of the vehicle at the authentication base station, comparing the authentication code from each of the responding tags with an authentication code key at the authentication base station to authenticate the responding tags, and transmitting a disengage signal to an immobilizer installed in the vehicle from the authentication base station to enable the vehicle if all the tags have been authenticated.

In an embodiment, an authentication base station of an authentication system comprises a transmitter configured to transmit an interrogation signal to tags attached to the components of the vehicle in response to a trigger event, a receiver configured to receive a response signal that includes an authentication code from one or more of the tags attached to the components of the vehicle, and a control unit configured to compare the authentication code from each of the responding tags with an authentication code key at the authentication base station to authenticate the responding tags. The control unit is further configured to transmit a disengage signal to an immobilizer installed in the vehicle to enable the vehicle if all the tags have been authenticated.

In an embodiment, an authentication system includes the authentication base station, as described above, and a plurality of tags attached to the components of the vehicle.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
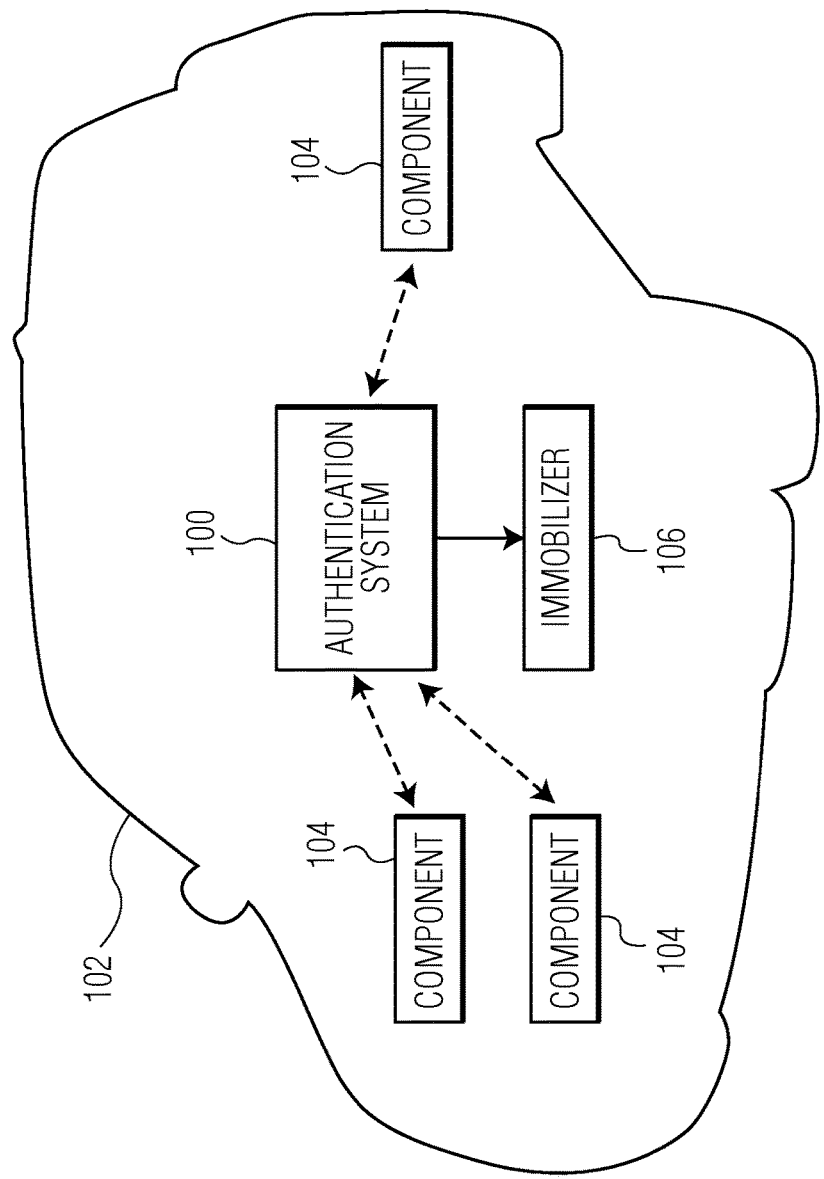
FIG. 1 is a diagram of a vehicle with an authentication system in accordance with an embodiment of the invention.

Turning now to FIG. 1, an authentication system 100 in accordance with an embodiment of the invention, which is installed in a vehicle 102, is shown. In the illustrated embodiment, the vehicle is an automobile. However, in other embodiments, the vehicle can be any type of a vehicle, such as a motorcycle, a recreational vehicle or a boat. As described in more detail below, the authentication system operates to enable the vehicle only when particular components 104 of the vehicle have been authenticated. That is, the vehicle can be started only when certain components of the vehicle have been authenticated. When one or more of these vehicular components are not authenticated, the authentication system disables the vehicle via an immobilizer 106 installed in the vehicle. That is, the vehicle cannot be started if one of more of these vehicular components are not authenticated. These vehicular components can be any components found in vehicles, such as electric car battery arrays, filters, engines/motors, suspensions, alternators and electronic systems. Typically, these components would be the more expensive parts of a vehicle. Since these components of the vehicle must be authenticated to enable the vehicle, these vehicular components cannot be replaced with unauthorized or stolen components. Thus, similar vehicular components cannot be used in other vehicles equipped with the VCA system, which discourages theft of vehicles for their parts.

Figure 2:
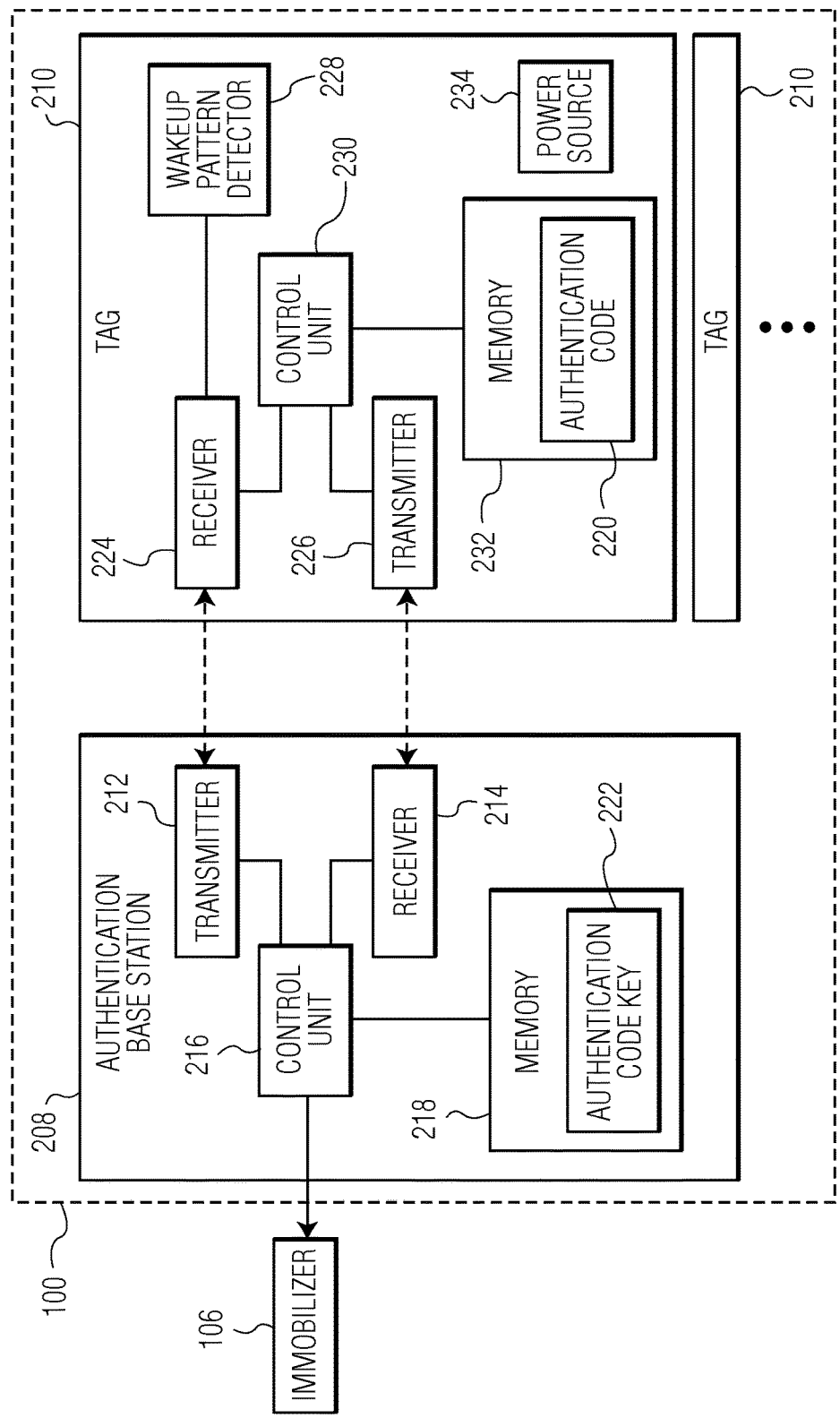
FIG. 2 is a block diagram of components of the authentication system in accordance with an embodiment of the invention.

Turning now to FIG. 2, a block diagram of components of the authentication system 100 in accordance with an embodiment of the invention is illustrated along with the immobilizer 106. As shown in FIG. 2, the authentication system includes an authentication base station 208 and a plurality of wireless tags 210. The wireless tags are attached to selected components of a vehicle, which must be authenticated in order to enable the vehicle. As noted above, the components of the vehicle to which the wireless tags are attached may include any component of the vehicle, preferable a costly or expensive component.

The authentication base station 208 operates to interrogate the wireless tags 210 attached to the components of the vehicle in response to a trigger event to authenticate the vehicular components currently in the vehicle. The trigger event may be a signal indicating that the vehicle may soon be started. As an example, the trigger event may be the unlocking of one or more doors of the vehicle, which would indicate that a driver is about to enter the vehicle and possibly start the vehicle. This event may be detected by a signal generated by a locking system (not shown) in the vehicle when the vehicle is unlocked either manually or automatically. As another example, the trigger event may be an activation of a user control device (not shown) on the vehicle, such as a button or a switch that can be engaged or turned on by the driver before the driver starts the vehicle. As another example, the trigger event may be a successful completion of a door unlocking process of a passive keyless entry. Any signal as a result of a trigger event may be transmitted to the authentication base station as a wireless or wired signal.

In the illustrated embodiment, the authentication base station 208 includes a wireless transmitter 212, a wireless receiver 214, a control unit 216 and memory 218. The wireless transmitter is used to transmit signals to the wireless tags 210 attached to the components of the vehicle. The wireless receiver is used to receive signals from the wireless tags attached to the components of the vehicle. The wireless transmitter and receiver may use any known wireless technology to transmit and receive wireless signals, such as radio frequency identification (RFID) technology. In some embodiments, the wireless transmitter and receiver may be integrated into a single device.

The control unit 216 of the authentication base station 208 operates to generate signals transmitted to the wireless tags 210 attached to the components of the vehicle and processes signals received from the wireless tags. In particular, the control unit compares an authentication code 220 received from each of the wireless tags attached to the components of the vehicle with a corresponding authentication code key 222, which is stored in the memory 218. The authentication code may be any code using any combination of characters, numbers and/or symbols. In an embodiment, the authentication code may be a combination of two or more unique codes. One of the unique codes used in the authentication code may be the chassis number or the engine number, which may be the same number and sometimes used as the "vehicle identification number" (VIN). The authentication code key includes at least a code that is identical to the authentication code. In some embodiments, the authentication system may use any kind of security process to secure the authentication code, such as scrambling of the authentication code on a dynamic bases using a random pattern generator (not shown) at the authentication base station, which is also synchronized with the wireless tags 210.

If all the wireless tags 210 attached to the components of the vehicle have been authenticated, i.e., the authentication code 220 from all the wireless tags matches the corresponding code in the authentication code key 222, the control unit 208 generates and transmits a disengage signal to the immobilizer 106 so that the immobilizer is disengaged, which means that the vehicle can be enabled or started. The disengage signal to the immobilizer may be transmitted as a wireless signal or a wired signal. If the disengage signal is transmitted as a wireless signal, the disengage code may be transmitted to the immobilizer using the wireless transmitter 212.

If one or more of the wireless tags 210 attached to the components of the vehicle have not been authenticated, the control unit 216 does not transmit the disengage signal to the immobilizer 106 so that the immobilizer remains engaged, which means that the vehicle cannot be enabled or started.

The memory 218 can be any type of a computer storage device that can store data, such as a non-volatile memory. Examples of a non-volatile memory that can be used include a one-time programmable (OTP) non-volatile memory, a multiple-time programmable (MTP) memory, an electrically erasable programmable read-only memory (EEPROM) or a flash memory. In an embodiment, the memory is a OPT non-volatile memory so that the authentication code key 222 can be programmed via one-time programming when the authentication system 100 is installed in the vehicle.

The authentication base station 208 may be connected to the battery of the vehicle to receive power. Alternatively or in addition to, the authentication base station may include an internal battery (not shown) to provide power to the various components of the authentication base station.

The wireless tags 210 of the authentication system 100 operate to respond to interrogation signals from the authentication base station 208 by transmitting the authentication code 220 so that the components to which the wireless tags are attached can be authenticated. As explained above, the vehicle is allowed to start only when all the components to which the wireless tags are attached have been authenticated by the authentication base station.

As shown in FIG. 2, each of the tags 210 attached to a component of the vehicle includes a wireless receiver 224, a wireless transmitter 226, an optional wake up pattern detector 228, a control unit 230, memory 232 and an optional power source 234. The wireless receiver is used to receive signals from the authentication base station 208, e.g., interrogation signals. The wireless transmitter is used to transmit signals to the authentication base station, e.g., the authentication code 220. The wireless transmitter and receiver of the tags must be compatible to the wireless transmitter and receiver of the authentication base station. Thus, the wireless transmitter and receiver of the tags use the same wireless technology used in the authentication base station, such as RFID technology. In an embodiment, the wireless transmitter 226 and other components of the tag are activated when a wake up pattern signal is received by the wireless receiver 224 and detected by the wake up pattern detector 228.

The control unit 230 of the wireless tags 210 generates signals transmitted to the authentication base station 208 and processes signals received from the authentication base station. In particular, the control unit transmits the authentication code 220, which is stored in the memory 232, to the authentication base station in response to an interrogation signal. The memory 232 can be any type of a computer storage device that can store data, such as a non-volatile memory. Examples of a non-volatile memory that can be used include an OTP non-volatile memory, an MTP memory, an EEPROM and a flash memory. In an embodiment, the memory 232 is an OTP non-volatile memory so that the authentication code can be programmed via one-time programming when the authentication system 100 is installed in the vehicle or when a replacement component with a wireless tag is purchased and/or installed.

The wireless tags 210 may be passive devices and inductively powered by the authentication base station 208. Alternatively, the wireless tags may be active devices powered by the battery of the vehicle and/or powered by the optional power supply 234, which may be an internal battery.

Figure 3:
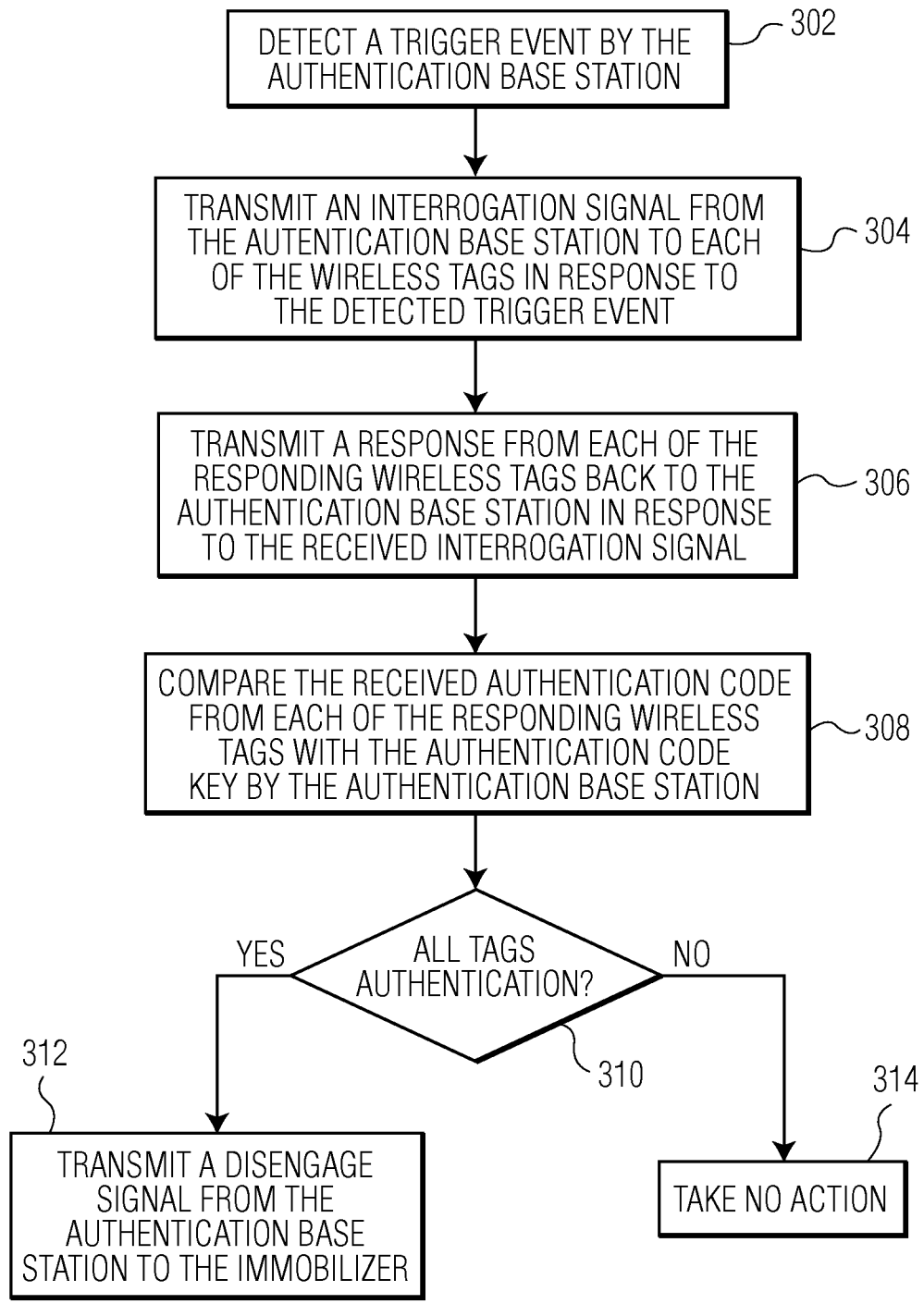
FIG. 3 is a process flow diagram of an operation of the authentication system of FIG. 2 in accordance with an embodiment of the invention.

An operation of the authentication system 100 of FIG. 1 in accordance with an embodiment of the invention is described with reference to a process flow diagram of FIG. 3. At block 302, a trigger event is detected by the authentication base station 208. As an example, a trigger event may be an unlocking of one or more doors of the vehicle. At block 304, an interrogation signal is transmitted from the authentication base station to each of the wireless tags 210 in response to the detected trigger event. The interrogation signal may be broadcasted to all the wireless tags. Alternatively, the interrogation signal may be transmitted to each of the wireless tags in a predefined sequence. At block 306, a response is transmitted from each of the responding wireless tags back to the authentication base station in response to the received interrogation signal. The response from each of the responding wireless tags includes the authentication code 220. At block 308, the received authentication code from each of the responding wireless tags is compared with the authentication code key 222 by the authentication base station to authenticate the components of the vehicle to which the wireless tags are attached. At block 310, a determination is made by the authentication base station whether all of the wireless tags have been authenticated. If all the wireless tags have been authenticated, a disengage signal is transmitted from the authentication base station to the immobilizer 106 so that the vehicle can be started and/or otherwise enabled, at block 312. However, if all the wireless tags have not been authenticated, no action is taken by the authentication base station, at block 314. In particular, a disengage signal is not transmitted from the authentication base station to the immobilizer. Thus, the vehicle remains unable to be started due to the engagement of the immobilizer. It is noted here that a wireless tag may not be authenticated due to lack of response from the wireless tag or the authentication code from that wireless tag does not match a corresponding code of the authentication code key.

In some implementations, the tags 210 may be required to transmit the authentication code 220 multiple times if there is a failure in authentication. There could be a protocol where the authentication base station 208 can retrigger the tags to send the authentication code for certain parts which have failed. Such protocol would make sure that authentication failure due to error in receiving due to noise, electromagnetic interference (EMI) etc. will be corrected.

Although the authentication system 100 has been described as being a wireless system, the authentication system may be a wired system in other embodiments. In these wired embodiments, the authentication base station 208 and the tags 210 may transmit and receive signals via a wired interface. As an example, the authentication base station and the tags may be connected to an in-vehicle network, such as a controller area network (CAN), a local interconnect network (LIN), a Flexray network or any other possible network.

In some embodiments, the authentication system 100 includes a keyless vehicle entry feature, which may be a feature commonly found in a remote keyless entry (RKE) system or a passive keyless entry (PKE) system. Thus, in these embodiments, the authentication system can be used to enter a vehicle as well as authenticate various components of the vehicle.

Figure 4:
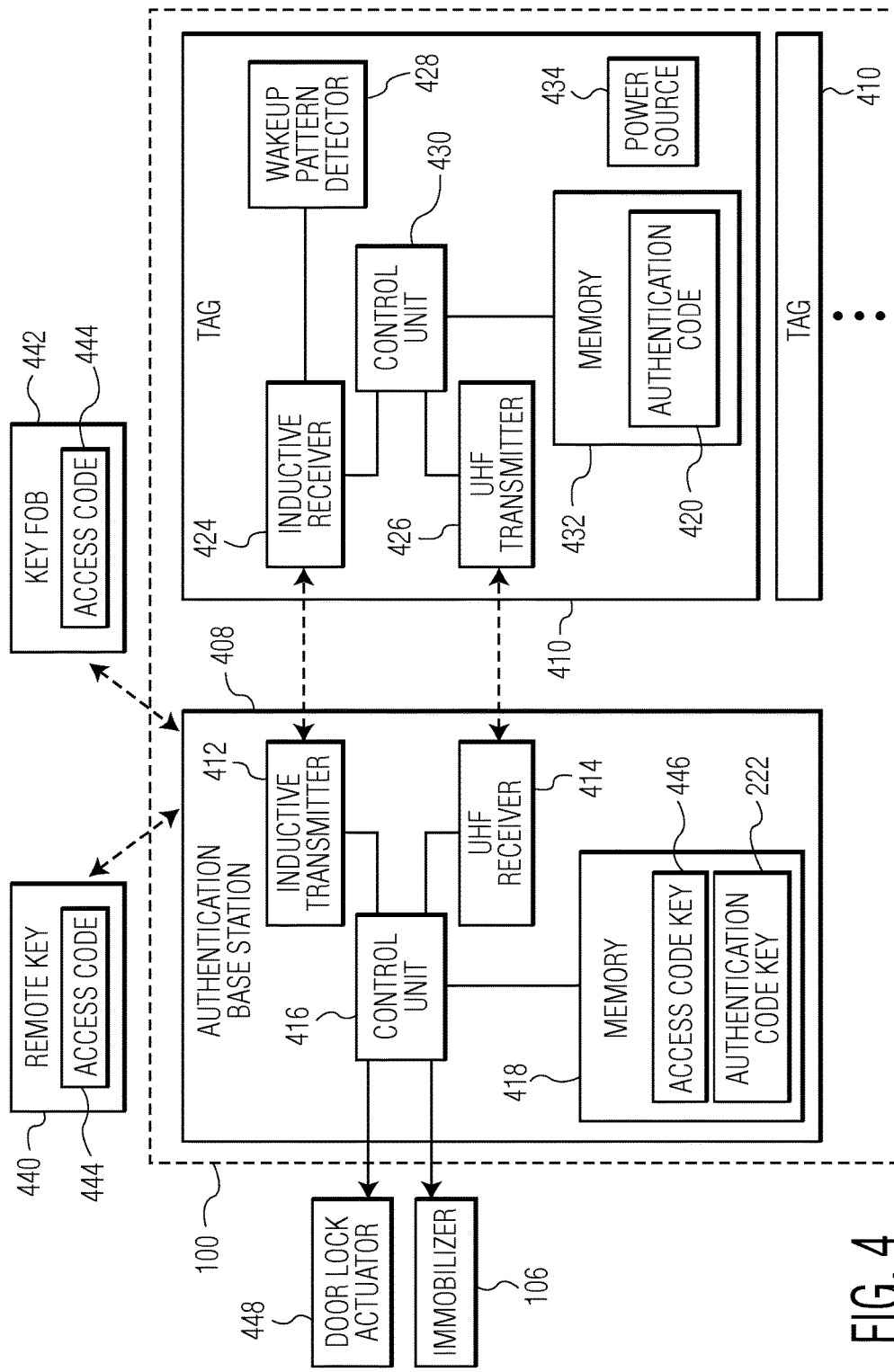
FIG. 4 is a block diagram of components of the authentication system in accordance with another embodiment of the invention.

Turning now to FIG. 4, a block diagram of components of the authentication system 100 with a keyless vehicle entry feature in accordance with another embodiment of the invention is shown. As shown in FIG. 4, in this embodiment, the authentication system includes an authentication base station 408 and a plurality of wireless tags 410, which operate with either a key remote 440 for a RKE feature or a key fob 442 for a PKE feature. The wireless tags are attached to selected components of a vehicle, which must be authenticated in order to enable the vehicle.

In this embodiment, the authentication base station 408 operates to unlock the vehicle using either RKE or PKE process and then authenticate the wireless tags 410 attached to components of the vehicle. After the vehicle has been unlocked in response to an unlock signal from the key remote 440 or in response to the presence of the key fob 442 in the vicinity of the vehicle, the authentication base station operates to interrogate the wireless tags in the vehicle to authenticate the vehicular components currently in the vehicle. Alternatively, after receiving the unlock signal, the authentication base station 408 may first authenticate the wireless tags and then unlock the vehicle. In an embodiment, a user may be able to override this process with a code from an authentic remote, which is only provided to the real owner of the vehicle.

In the illustrated embodiment, the authentication base station 408 includes an inductive transmitter 412, an ultra-high frequency (UHF) receiver 414, a control unit 416 and memory 418. The inductive transmitter is used to transmit signals to the wireless tags 410 attached to the components of the vehicle to wake up the wireless tags and to transmit data, e.g., interrogation signals, to the wireless tags. If the authentication system 100 has a PKE feature, then the inductive transmitter is also used to wake up the key fob and transmit a coded signal to the key fob, as described below. The inductive transmitter may be a 125 kHz inductive transmitter that uses a 125 kHz carrier frequency. The UHF receiver is used to receive signals in a UHF range from the wireless tags attached to the components of the vehicle. The UHF receiver is also used to receive signals in a UHF range from the key fob for the PKE feature or from the key remote 440 to unlock the vehicle, as described below.

The control unit 416 of the authentication base station 408 operates to generate signals transmitted to the wireless tags 410 attached to the components of the vehicle and/or the key fob 442 via the inductive transmitter 412 and processes signals received from the wireless tags, the key fob and/or the key remote 440 via the UHF receiver 414. In particular, the control unit compares an access code 444 from the key fob or the key remote with an access code key 446, which is stored in the memory 418. The access code is transmitted to unlock one or more doors of the vehicle. Thus, the access code may be referred to herein as an unlock signal. If the received access code matches the access code key, then the control unit transmits a control signal to a door lock actuator 448 to unlock one or more doors of the vehicle. In addition, the control unit compares the authentication code 220 from each of the wireless tags 410 attached to the components of the vehicle with the authentication code key 222, which is also stored in the memory. If all the wireless tags attached to the components of the vehicles have been authenticated, the control unit generates and transmits a disengage signal to the immobilizer 106 so that the immobilizer is disengaged, which means that the vehicle can be enabled or started. The disengage signal to the immobilizer may be transmitted as a wireless signal or a wired signal. If the disengage signal is transmitted as a wireless signal, the disengage signal may be transmitted to the immobilizer using the inductive transmitter. If one or more of the wireless tags have not been authenticated, the control unit does not transmit the disengage signal to the immobilizer so that the immobilizer remains engaged, which means that the vehicle cannot be enabled or started.

The memory 418 can be any type of a computer storage device that can store data, such as a non-volatile memory. Examples of a non-volatile memory that can be used include an OTP non-volatile memory, an MTP memory, an EEPROM and a flash memory. In an embodiment, the memory is an OTP non-volatile memory so that the authentication code key 222 and/or the access code key 446 can be programmed via one-time programming when the authentication system is installed in the vehicle.

The authentication base station 408 may be connected to the battery of the vehicle to receive power. Alternatively or in addition to, the authentication base station may include an internal battery (not shown) to provide power to the components of the authentication base station.

The wireless tags 410 of the authentication system 100 operate to respond to interrogation signals from the authentication base station 408 by transmitting the authentication code 220 so that the components to which the wireless tags are attached can be authenticated. As explained above, the vehicle is allowed to start only when all the components to which the wireless tags are attached have been authenticated by the authentication base station.

As shown in FIG. 4, each of the tags 410 attached to the components of the vehicle includes an inductive receiver 424, a UHF transmitter 426, a wake up pattern detector 428, a control unit 430, memory 432 and an optional power source 434. The inductive receiver is used to receive signals from the authentication base station 408, e.g., interrogation signals. The UHF transmitter is used to transmit signals to the authentication base station, e.g., the authentication code. The UHF transmitter and the inductive receiver of the tags must be compatible to the transmitter and receiver of the authentication base station. Thus, the transmitter and receiver of the tags use the same wireless technology used in the authentication base station, such as RFID technology. In the illustrated embodiment, the inductive transmitter is a 125 kHz inductive receiver. The UHF transmitter is used to transmit UHF signals to the authentication base station. In an embodiment, the UHF transmitter and other components of the tag are activated when a wake up pattern signal is received by the inductive receiver and detected by the wake up pattern detector.

The control unit 430 of the wireless tags 410 generates signals transmitted to the authentication base station 408 and processes signals received from the authentication base station. In particular, the control unit transmits the authentication code 220, which is stored in the memory 432, to the authentication base station in response to an interrogation signal. The memory 432 can be any type of a computer storage device that can store data, such as a non-volatile memory. Examples of a non-volatile memory that can be used include an OTP non-volatile memory, an MTP memory, an EEPROM and a flash memory. In an embodiment, the memory is an OTP non-volatile memory so that the authentication code can be programmed via one-time programming when the authentication system 100 is installed in the vehicle or when a replacement component with a wireless tag is purchased and/or installed in the vehicle.

The wireless tags 410 may be passive devices and inductively powered by the authentication base station 408, i.e., a signal transmitted from the authentication base station to the wireless tags via the inductive transmitter 412. Alternatively, the wireless tags may be active devices powered by the battery of the vehicle and/or powered by the optional power source 434, which may be any type of a battery.

In an embodiment, the key fob 442 may include components similar to the wireless tags 410, such as the inductive receiver 424, the UHF transmitter 426, the wake up pattern detector 428, the control unit 430, the memory 432 and the optional power source 434. However, the key fob would include the access code 444 stored in its memory, rather than the authentication code 220.

Figure 5:
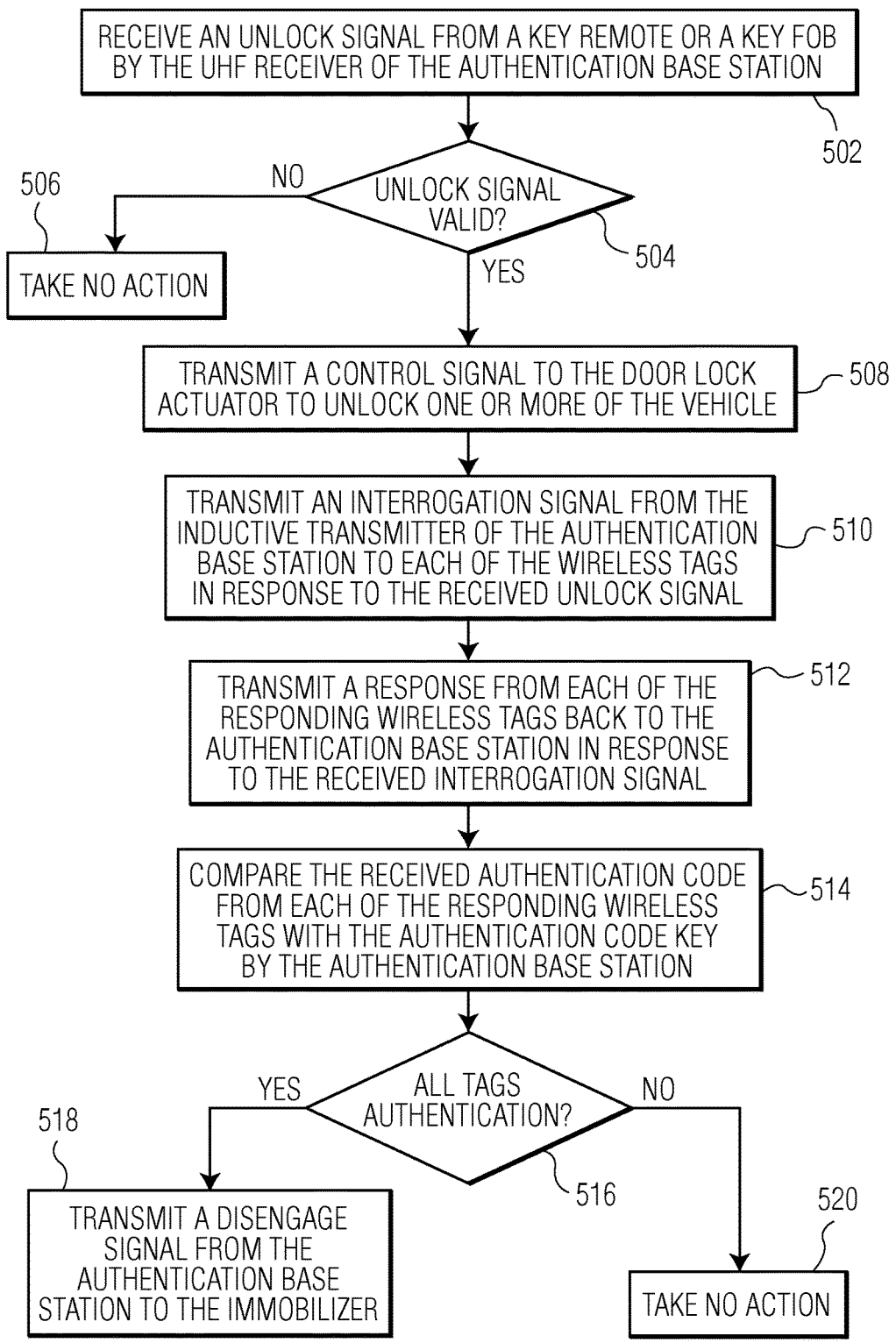
FIG. 5 is a process flow diagram of an operation of the authentication system of FIG. 4 in accordance with an embodiment of the invention.

An operation of the authentication system 100 of FIG. 4 installed in a vehicle in accordance with an embodiment of the invention is described with reference to a process flow diagram of FIG. 5. At block 502, an unlock signal from the key remote 440 or the key fob 442 is received by the UHF receiver 414 of the authentication base station 408 of the authentication system. If the authentication system has an RKE feature, the unlock signal is transmitted from the key remote 440 when a user presses an unlock button on the key remote. If the authentication system has a PKE feature, the unlock signal is transmitted from the key fob 442 as part of a PKE process when the presence of a user with the key fob is detected. As an example, the user with the key fob may be detected by an infra-red detector under a door handle of the vehicle or by a capacitive proximity detector near or on the door handle as the user approaches the door handle to open the door. In particular, when the presence of the user with the key fob is detected, the inductive transmitter 412 transmits a wake up pattern signal to the key fob, which is detected by the key fob. After the wake up pattern signal is detected by the key fob, the key fob transmits the unlock signal, which is received by the UHF receiver of the authentication base station.

At block 504, a determination is made by the control unit 416 of the authentication base station 408 whether the received unlock signal is valid. If the received unlock signal is not valid, no action is taken by the authentication base station, at block 506, and the process comes to an end. If the received unlock signal is valid, a control signal is transmitted from the control unit 416 of the authentication base station to the door lock actuator 448, at block 508, to unlock one or more doors of the vehicle.

At block 510, an interrogation signal is transmitted from the inductive transmitter 412 of the authentication base station 408 to each of the wireless tags 410 in response to the received unlock signal. The interrogation signal may be broadcasted to all the wireless tags. Alternatively, the interrogation signal may be transmitted to each of the wireless tags in a predefined sequence. At block 512, response is transmitted from each of the responding wireless tags back to the authentication base station in response to the received interrogation signal. The response from each of the wireless tags includes the authentication code. At block 514, the received authentication signal from each of the responding wireless tags is compared with the authentication code key 222 by the authentication base station to authenticate the components of the vehicle to which the wireless tags are attached. At block 516, a determination is made by the authentication base station whether all of the wireless tags have been authenticated. If all the wireless tags have been authenticated, a disengage signal is transmitted from the authentication base station to the immobilizer 106 so that the vehicle can be started and/or otherwise enabled, at block 518. However, if all the wireless tags have not been authenticated, no action is taken by the authentication base station, at block 520. In particular, a disengage signal is not transmitted from the authentication base station to the immobilizer. Thus, the vehicle remains unable to be started due to the engagement of the immobilizer.

It is noted here that a wireless tag may not be authenticated due to lack of response from the wireless tag or the authentication code from that wireless tag does not match a corresponding code of the authentication code key.

In an embodiment, if the authentication fails, the authentication system 100 may provide an option to override the system with a special code from the key remote 440 or the key fob 442, which is the authentic key provided only to the owner of the vehicle. This is an optional feature that can be implemented to make sure that the real user of the vehicle is not penalized until the problem is solved.

In an alternative embodiment, the inductive transmitter 412 of the authentication base station 408 may be replaced with another type of a wireless transmitter, e.g., a UHF transmitter, and the inductive receivers 424 of the tags 410 may be replaced with another type of wireless receiver, e.g., UHF receivers. In this alternative embodiment, the authentication base station would wake up the tags on the UHF link. However, using higher frequency communication from the authentication base station to the tags would increase power usage in the tags.

In some implementations, the wireless tags 410 may be required to transmit the authentication code 220 multiple times if there is a failure in authentication. There could be a protocol where the authentication base station 408 can retrigger the tags to send the authentication code for certain parts which have failed. Such protocol would make sure that authentication failure due to error in receiving due to noise, EMI etc. will be corrected.

Figure 6:
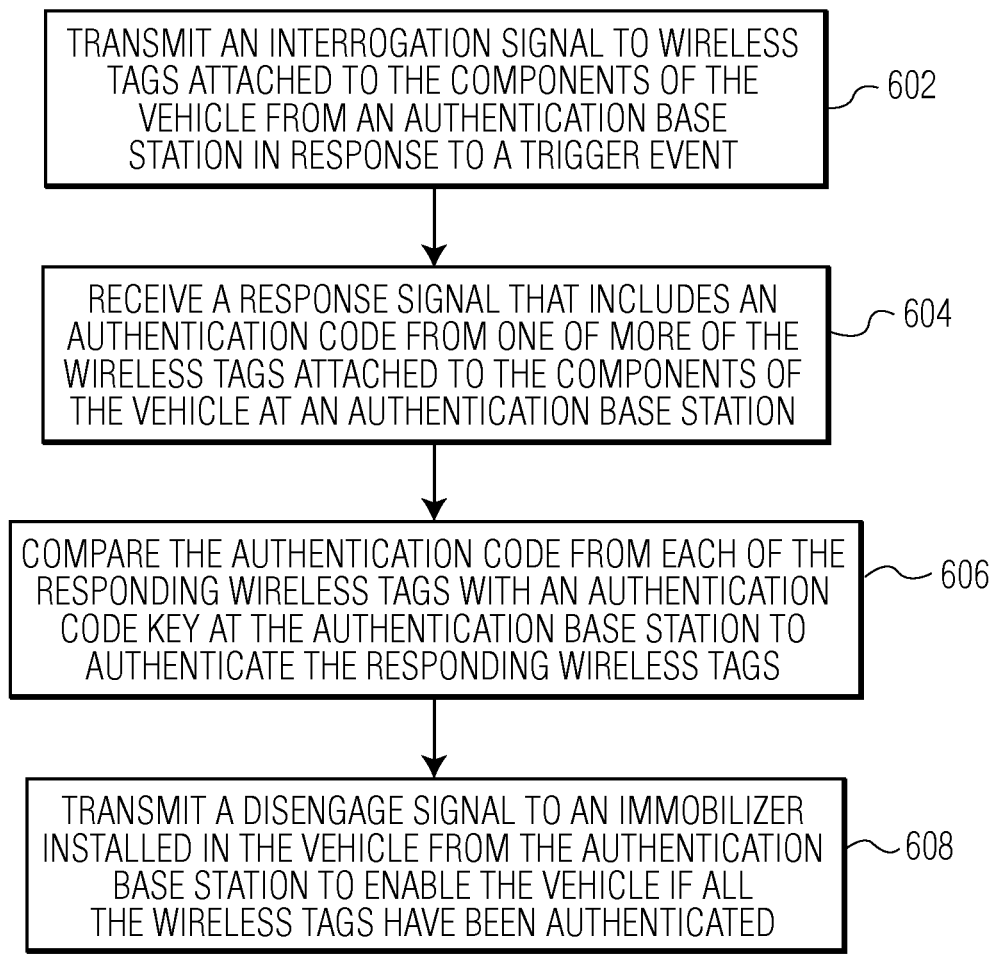
FIG. 6 is a process flow diagram of a method for authenticating components of a vehicle in accordance with an embodiment of the invention.

FIG. 6 is a process flow diagram of a method for authenticating components of a vehicle in accordance with an embodiment of the invention. At block 602, an interrogation signal transmitted to wireless tags attached to the components of the vehicle from an authentication base station in response to a trigger event. At block 604, a response signal that includes an authentication code is received from one of more of the wireless tags attached to the components of the vehicle at the authentication base station. At block 606, the authentication code from each of the responding wireless tags is compared with an authentication code key at the authentication base station to authenticate the responding wireless tags. At block 608, a disengage signal is transmitted to an immobilizer installed in the vehicle from the authentication base station to enable the vehicle if all the wireless tags have been authenticated.

The various components or units of the embodiments that have been described or depicted (e.g., the wake up pattern detector) may be implemented in hardware, software that is stored in a non-transitory computer readable medium or a combination of hardware and software that is stored in a non-transitory computer readable medium. The non-transitory computer readable medium can be an electronic, magnetic, optical, electromagnetic, infrared, or semiconductor system (or apparatus or device), or a propagation medium. Examples of a non-transitory computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), and a Blu-ray disk. Furthermore, the various components or units of the embodiments (e.g., the wake up pattern detector) that have been described or depicted may be implemented in a processor, which may include a multifunction processor and/or an application-specific processor.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for authenticating components of a vehicle, the method comprising:
   detecting a presence of a key fob and transmitting a wake up pattern signal to wake up the key fob using an inductive transmitter;
   using the inductive transmitter, waking up tags attached to the components of the vehicle and transmitting an interrogation signal to the tags attached to the components of the vehicle from an authentication base station installed in the vehicle in response to a trigger event including receiving an unlock signal from the key fob;
   using a ultra-high frequency (UHF) receiver, receiving a response signal that includes an authentication code from one or more of the tags attached to the components of the vehicle at the authentication base station;
   comparing the authentication code from each of the responding tags with an authentication code key at the authentication base station to authenticate the responding tags; and
   transmitting a disengage signal to an immobilizer installed in the vehicle from the authentication base station to enable the vehicle if not all the tags have been authenticated and if an override code is received from the key fob or a key remote.

2. The method of claim 1, wherein the trigger event is an unlocking of at least one door of the vehicle.

3. The method of claim 1, wherein the trigger event is a successful completion of a door unlocking process of a passive keyless entry.

4. The method of claim 1, wherein the authentication code and the authentication code key includes an engine number, a chassis number or a vehicle identification number (VIN).

5. The method of claim 1, wherein receiving the response signal includes receiving the response signal using a wireless receiver of the authentication base station, and wherein the method further comprises receiving a signal from the key remote using the same wireless receiver.

6. An authentication base station of an authentication system installed in a vehicle for authenticating components of the vehicle, the authentication base station comprising:
   a transmitter configured to transmit a wake up pattern signal to wake up a key fob in response to detecting a presence of the key fob, to wake up tags attached to the components of the vehicle and to transmit an interrogation signal to the tags attached to the components of the vehicle in response to a trigger event including receiving an unlock signal from the key fob, wherein the transmitter is an inductive transmitter;
   a receiver configured to receive a response signal that includes an authentication code from one or more of the tags attached to the components of the vehicle, wherein the receiver is a ultra-high frequency (UHF) receiver; and
   a control unit configured to compare the authentication code from each of the responding tags with an authentication code key at the authentication base station to authenticate the responding tags, the control unit being further configured to transmit a disengage signal to an immobilizer installed in the vehicle to enable the vehicle if not all the tags have been authenticated and if an override code is received from the key fob or a key remote.

7. The authentication base station of 6, wherein the transmitter is configured to transmit the interrogations signal in response to an unlocking of at least one door of the vehicle.

8. The authentication base station of 6, wherein the transmitter is configured to transmit the interrogations signal in response to a successful completion of a door unlocking process of a passive keyless entry.

9. The authentication base station of 6, wherein the authentication code and the authentication code key includes an engine number, a chassis number or a vehicle identification number (VIN).

10. The authentication base station of 6, wherein the transmitter is also configured to receive a signal from the key fob.

11. An authentication system comprising:
    a plurality of tags attached to components of a vehicle, each of the tags including an authentication code stored therein; and
    an authentication base station installed in the vehicle, the authentication system comprising:
       a transmitter configured to transmit a wake up pattern signal to wake up a key fob in response to detecting a presence of the key fob, to wake up the tags attached to the components of the vehicle and to transmit an interrogation signal to the tags attached to the components of the vehicle in response to a trigger event including receiving an unlock signal from the key fob, wherein the transmitter is an inductive transmitter;
       a receiver configured to receive a response signal that includes an authentication code from one or more of the tags attached to the components of the vehicle, wherein the receiver is a ultra-high frequency (UHF) receiver; and
       a control unit configured to compare the authentication code from each of the responding tags with an authentication code key at the authentication base station to authenticate the responding tags, the control unit being further configured to transmit a disengage signal to an immobilizer installed in the vehicle to enable the vehicle if not all the tags have been authenticated and if an override code is received from the key fob or a key remote.

* * * * *